(12) United States Patent
Ibáñez Panizo et al.

(10) Patent No.: US 12,536,742 B2
(45) Date of Patent: Jan. 27, 2026

(54) METHOD FOR FORENSIC IDENTIFICATION BY AUTOMATICALLY COMPARING A 3D MODEL OF A SKULL WITH ONE OR MORE PHOTOS OF A FACE

(71) Applicants: PANACEA COOPERATIVE RESEARCH S. COOP., León (ES); UNIVERSIDAD DE GRANADA, Granada (ES)

(72) Inventors: Óscar Ibáñez Panizo, León (ES); Andrea Valsecchi, León (ES); Enrique Bermejo Nievas, Granada (ES); Rubén Martos Fernández, Granada (ES); Pablo Mesejo Santiago, Granada (ES); Práxedes Martínez Moreno, Granada (ES); Guillermo Gómez Trenado, Granada (ES); Óscar Cordón García, Granada (ES); Sergio Damas Arroyo, Granada (ES); Rosario Guerra Martí, Granada (ES); Inmaculada Alemán Aguilera, Granada (ES)

(73) Assignees: PANACEA COOPERATIVE RESEARCH S. COOP., León (ES); UNIVERSIDAD DE GRANADA, Granada (ES)

( * ) Notice: Subject to any disclaimer, the term of this patent is extended or adjusted under 35 U.S.C. 154(b) by 163 days.

(21) Appl. No.: 18/575,992

(22) PCT Filed: Jun. 29, 2022

(86) PCT No.: PCT/ES2022/070413
§ 371 (c)(1),
(2) Date: Jan. 2, 2024

(87) PCT Pub. No.: WO2023/275420
PCT Pub. Date: Jan. 5, 2023

(65) Prior Publication Data
US 2024/0320911 A1     Sep. 26, 2024

(30) Foreign Application Priority Data

Jul. 2, 2021  (ES) .............................. ES202130618

(51) Int. Cl.
*G06T 17/00*     (2006.01)
*G06T 5/50*      (2006.01)
(Continued)

(52) U.S. Cl.
CPC ............... *G06T 17/00* (2013.01); *G06T 5/50* (2013.01); *G06T 7/70* (2017.01); *G06V 10/24* (2022.01);
(Continued)

(58) Field of Classification Search
CPC .. G06T 17/00; G06T 7/70; G06T 5/50; G06T 2207/20221; G06V 40/168; G06V 10/24; G06V 2201/07
(Continued)

(56) References Cited

U.S. PATENT DOCUMENTS

| 2012/0182294 A1* | 7/2012 | Cordon Garcia ....... G06T 19/00 345/419 |
| 2019/0035149 A1* | 1/2019 | Chen .................... G06V 40/166 |
| 2022/0092840 A1* | 3/2022 | Choi .................... G06V 10/764 |

FOREIGN PATENT DOCUMENTS

| CN | 109146845 A | 1/2019 |
| EP | 2461271 A2 | 6/2012 |

(Continued)

OTHER PUBLICATIONS

Campomanes-Alvarez, B. Rosario et al., "Modeling Facial Soft Tissue Thickness for Automatic Skull-Face Overlay", Journal, Oct. 2015, p. 2057-2070, vol. 10, No. 10, IEEE Transactions on Information Forensics and Security.
(Continued)

*Primary Examiner* — Hai Tao Sun
(74) *Attorney, Agent, or Firm* — Hayes Soloway P.C.

(57) ABSTRACT

Disclosed is a method for identifying multiple skulls and different subjects, using (i) a 3D model of each skull and (ii) one or more clear photos of the face of each candidate subject, wherein the method comprises the steps of: detecting craniometric points on the 3D skull models; estimating the thickness and direction of the soft facial tissue; detecting cephalometric landmarks in the face photos; and filtering on the basis of morphometric consistencies between the skull and the face, craniofacial superimposition in multiple photos, and decision making.

4 Claims, 2 Drawing Sheets

(51) Int. Cl.
  *G06T 7/70* (2017.01)
  *G06V 10/24* (2022.01)
  *G06V 40/16* (2022.01)
(52) U.S. Cl.
  CPC .. *G06V 40/168* (2022.01); *G06T 2207/20221* (2013.01); *G06V 2201/07* (2022.01)
(58) Field of Classification Search
  USPC ........................................................ 345/419
  See application file for complete search history.

(56) References Cited

FOREIGN PATENT DOCUMENTS

| | | |
|---|---|---|
| WO | 2015131091 A1 | 9/2015 |
| WO | 2020206135 A1 | 10/2020 |

OTHER PUBLICATIONS

Huete, Maria Isabel et al., "Past, present, and future of craniofacial superimposition: Literature and international surveys", Journal, 2015, p. 1-12, Legal Medicine.

Goos, Mirelle I.M. et al., "2D/3D image (facial) comparison using camera matching", Journal, 2006, p. 10-17, vol. 163, Forensic Science International.

Ibanez, Oscar et al., "An advanced scatter search design for skull-face overlay in craniofacial superimposition", Journal, 2012, p. 1459-1473, vol. 39, Expert Systems with Applications.

Qian, Jiahong et al., "CephaNet: an Improved Faster R-CNN for Cephalometric Landmark Detection", Symposium, Apr. 8-11, 2019, p. 868-871, 2019 IEEE 16th International Symposium on Biomedical Imaging (ISBI 2019).

Valsecchi, Andrea et al., "A Robust and Efficient Method for Skull-Face Overlay in Computerized Craniofacial Superimposition", Journal, Aug. 2018, p. 1960-1974, vol. 13, No. 8, IEEE Transactions on Information Forensics and Security.

Yoshino, Mineo, "Craniofacial superimposition", Book, 2012, p. 238-251, Ch. 19, Part II, Identification of the Dead.

* cited by examiner

METHOD FOR FORENSIC IDENTIFICATION BY AUTOMATICALLY COMPARING A 3D MODEL OF A SKULL WITH ONE OR MORE PHOTOS OF A FACE

FIELD OF THE INVENTION

The present invention belongs to the fields of forensic identification and artificial intelligence, in the machine learning, computer vision and decision support systems fields.

More particularly, the invention is framed within forensic identification techniques based on the skeleton, and more specifically on the skull. The invention is applied in the identification of deceased human beings when one or more ante-mortem (AM) photographs of the face and a three-dimensional model of the skull are available, such as those obtained by 3D scanning, CT scan, MRI, or other means.

BACKGROUND OF THE INVENTION

The identification of the deceased is of great importance in our society, both for its usefulness in solving serious legal and social problems, as well as for its assistance to grieving families because of a lost or a disappearance. Over the last two decades, techniques such as DNA or fingerprints comparison have been used in numerous identification scenarios. Unfortunately, the application of these methods can fail due to the state of preservation of the corpse or the lack of a second DNA sample to compare with. Unlike soft tissues, the skeleton generally survives natural decomposition processes and other factors such as fire, exposure to chemicals, etc. Therefore, forensic identification techniques based on the skeleton represent the last chance for victim identification.

Craniofacial overlay (CFO) consists of superimposing the image of a skull with AM photographs of an individual's face, followed by analysis of their morphological correspondence, to determine whether the skull belongs to the subject of the photographs [YOSHINO M. Craniofacial superimposition. Craniofacial Identification 2012; 238-253]. For each photograph of the face, it is necessary to perform a craniofacial superimposition (CFS), i.e., to obtain an image of the skull with the same pose and size as the face in the photograph. The approaches to obtain such an image are four [HUETE MI, IBÁÑEZ O, WILKINSON C, et al. Past, present, and future of craniofacial superimposition: Literature and international surveys. Leg Med (Tokyo) 2015; 17:267-278]:

The first approach relies on acquiring a photograph of the physical skull by placing the skull on a stand and adjusting its position, orientation, and distance from the camera. This involves a long and tedious process of trial and error until the pose of the photograph of the face is reproduced as closely as possible. It is important to note that this assessment is subjective and prone to error.

In the second approach, instead of a still camera, a video camera connected to a screen is used. This avoids the process of developing analog photographs.

In the third approach, the physical skull is replaced by a 3D model obtained by 3D scanning. Using computer software, the 3D model is placed in a virtual scene, adjusting its position, orientation, and size until the pose of the facial photograph is reproduced. Although this approach is faster than the previous one, the task of positioning the skull remains tedious and the assessment of having obtained the best possible superimposition does not lose its subjective character.

The fourth approach also uses a 3D model of the skull. The CFS task is reduced to a computer vision problem and solved by means of a computer program. In this context, the problem of estimating position, orientation, and camera lens from a photograph of a known object is called camera calibration. A series of reference points, located both on the 3D object and on the photograph, are used to solve this problem. In the case of CFS, a series of anatomical landmarks located on the skull (craniometric landmarks) and on the face (cephalometric landmarks) are used. Corresponding craniometric and cephalometric landmarks are placed in close positions, being separated only by a layer of facial soft tissue. It follows that, when the face and skull are superimposed, each pair of corresponding anatomical landmarks must superimpose exactly. This approach avoids the manual trial-and-error process for skull placement but requires the location of a set of anatomical landmarks on both the face photograph and the 3D skull model, and the estimation of the facial soft tissue thickness for each anatomical landmark. Such estimation can be performed using mean values collected in population studies. The location of anatomical landmarks is itself a tedious and subjective task, although to a lesser extent than performing a CFS by one of the above approaches.

For all these reasons, forensic identification by CFO is not considered a primary identification technique but a secondary technique. This classification differentiates the techniques considered more reliable, primary techniques (fingerprint, teeth and DNA analysis), which allow establishing a positive identification, from secondary techniques, which contribute to an identification by limiting the possible matches with the individual. On the other hand, none of the existing CFO approaches is fully automatic, which limits their application in multiple-comparison scenarios.

SUMMARY OF THE INVENTION

The present invention solves the technical problem of comparing 3D models of one or more previously existing skulls with facial photographs of one or more persons in a fully automatic, objective, and accurate manner. There are available for this purpose (i) three-dimensional models of said skulls and (ii) one or more indubitable facial photographs of each of the possible candidates. The identification procedure of the present invention is based on craniofacial overlay implemented in a processor and does not require human intervention. This process, in addition to being automatic, is much faster, and therefore allows identification even in scenarios with a large number of victims (multiple comparisons). Furthermore, the process provides a degree of objective, reproducible and accurate identification support, allowing for the first time the application of CFO as a primary identification technique.

The invention permits both the comparison of one skull against a large number of photographs, and the comparison of different skulls against a single photograph, and even the comparison of multiple skulls with multiple photographs.

The term "subject" refers in the present invention to human beings. The term "facial photograph" comprises photographs of a person in which the face is visible. The term "dubitated skull" refers generally to the skull of a subject of unknown identity. The term "indubitable photograph" refers, in general, to a photograph of a subject of known identity. The term "3D model" refers to a digital three-dimensional model obtained by 3D scanning based on laser measurements, photogrammetry, structured light, CT scan, MRI, or other means.

The method of the invention comprises the following steps, all performed by means of a computer:
1. Detection of craniometric landmarks in 3D skull models
2. Estimation of facial soft tissue thickness and direction
3. Detection of cephalometric landmarks in facial photographs
4. Estimation of camera-subject distance (optional)
5. Filtering based on morphometric consistencies between the skull and the face (optional)
6. Craniofacial superimposition in multiple photographs
7. Decision making The identification procedure starts with the detection of craniometric landmarks on the 3D model of the skull and the estimation of facial soft tissue thickness and direction. Next, a cephalometric landmark detection and optionally a camera-subject distance estimation is performed on each of the available photographs. Optionally, results are then filtered according to the morphometric consistency between the skull and the face. Thus, certain photographs will be assessed as not compatible with the skull, and therefore the subjects relative to those photographs will be discarded. Then, for each of the subjects, the skull is superimposed on the face in the set of photographs of that subject, i.e., the procedure performs an CFS for each photograph. Finally, a last step of automatic decision making is carried out, in which each skull-subject pair being considered is assigned a score of the degree of belonging and based on this a positive or negative decision is made as to whether they are the same person or not.

In steps 1, 2 and 3, the information necessary for the rest of the CFO process is obtained automatically, objectively, and accurately. Therefore, these steps allow the entire process to be automatic, dispensing with the availability of a forensic expert, saving time, and obtaining objective and accurate results. Step 4 (optional) adds precision to the CFSs by reducing the search interval for the camera-subject distance parameter, a secondary contribution to the accuracy of the technique. Step 5 (optional) adds speed to the invention, because it saves the time of performing the CFSs of the discarded cases. Finally, steps 6 and 7 complete the CFO process automatically, accurately, and objectively. These last two characteristics are key contributions for the technique to be considered primary.

BRIEF DESCRIPTION OF THE FIGURES

To help a better understanding of the characteristics of the invention and to complement this description, some figures, whose character is illustrative and not limiting, are included as an integral part of this description.

DETAILED DESCRIPTION OF THE INVENTION

Figure 1:
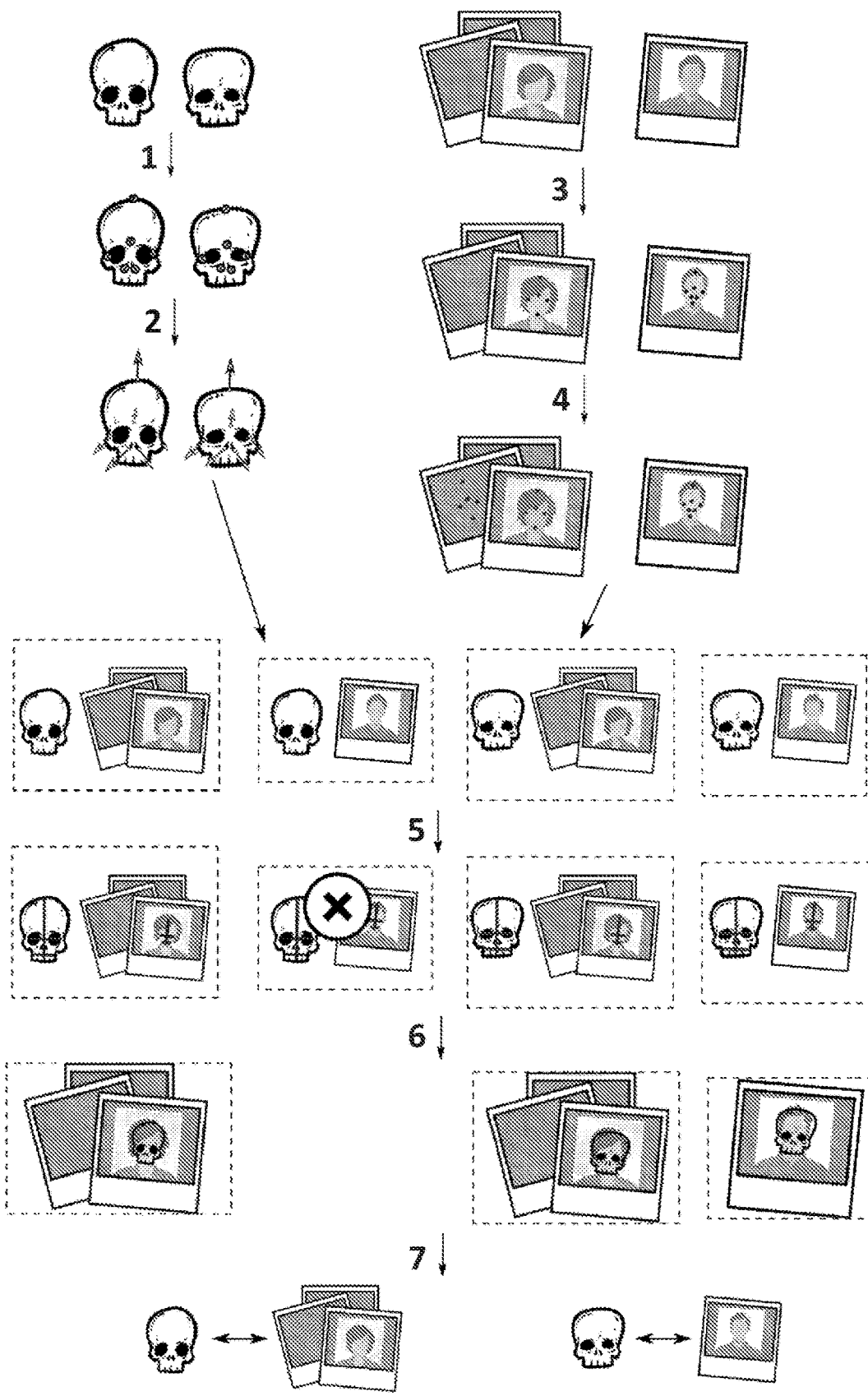
FIG. 1 shows the process carried out by the invention, highlighting the seven steps that compose it. The process starts with the detection of craniometric landmarks on the 3D skull models (step 1) and continues with the estimation of facial soft tissue (step 2). Next, cephalometric landmark detection is performed on each photograph (step 3) and camera-subject distance estimation (step 4). The process continues with the matching of each skull with each set of photographs of the same subject. Next, case filtering based on morphometric correspondences is performed (step 5), followed by craniofacial superimposition (step 6). The process ends with the decision-making step (step 7).

1. Detection of Craniometric Landmarks in the 3D Skull Model

This process consists of two phases. The first phase uses a template (a 3D model generated from multiple 3D skull models) where the craniometric landmarks have been located. Both the process of obtaining the template and the process of locating craniometric landmarks thereon has been carried out prior to the development of the invention and does not need to be done again. By means of an algorithm, said template is adapted in dimensions and aligned with the scanned skull, so that the two are overlaid. Next, another algorithm transfers the craniometric landmarks from the template to the skull; specifically, each craniometric landmark is located to the closest landmark on the skull, thus providing its initial location. In the second phase, another algorithm refines the location of each craniometric landmark according to specific criteria for each type of craniometric landmark.

These criteria can be grouped into four families:
a. Symmetry. An algorithm calculates the mid-sagittal plane of the skull; the initial position of a craniometric landmark is replaced with that of the nearest landmark in the mid-sagittal plane.
b. Contours. An algorithm detects the contours of the nostrils and eye sockets; the initial position of a craniometric landmark is replaced with that of the nearest landmark within the contours.
c. Extreme points. An algorithm replaces the initial position of a craniometric landmark with that of the most superior/inferior, anterior/posterior, or lateral landmark in the vicinity of the initial landmark.
d. Sutures. An algorithm detects skull sutures; the initial position of a craniometric landmark is replaced with that of the closest landmark within the suture.
e. Geometric calculations. Craniometric landmarks, which position is obtained from a calculation on the position of other craniometric landmarks (e.g. the midpoint between two craniometric landmarks), are placed at the closest point of the skull from the calculated position.

2. Facial Soft Tissue Thickness and Direction Estimation

Facial soft tissue is a key element of CFO. Given a skull and the location of the craniometric landmarks, the procedure estimates the 3D position of the corresponding cephalometric landmarks. To do so, an algorithm capable of estimating on the one hand the facial soft tissue thickness between each pair of corresponding anatomical landmarks, and on the other hand the direction of the vector joining the craniometric and cephalometric landmarks, is used. To develop this algorithm, a Machine Learning (ML) model has been used, which has been trained on a self-created database of 3D cranial and facial models of the same subjects. In these 3D models, both cephalometric and craniometric landmarks have been located and then the length and direction of the vectors between corresponding anatomical landmarks have been calculated. Finally, the dataset includes information about the subjects, namely age, lineage, sex, and BMI. Regression models such as linear regression by ordinary least squares, support vector machines, random forest or artificial neural networks can be used for the ML model. In the preferred embodiment of the invention an artificial neural network is used.

3. Detection of Cephalometric Landmarks in Facial Photographs

The anatomical landmark detection system is responsible for locating the cephalometric landmarks visible in a facial photograph. The system is the result of a machine learning process. To this purpose, a dataset is created, consisting of facial photographs where the position of the cephalometric landmarks has been manually annotated. These data are used to train a deep neural network, using the architecture and initial weights of an existing network. Note that the system can classify as "not visible" the anatomical landmarks that are not visible in the photograph due to the pose of the subject.

The training process modifies the initial network and adapts its performance to the detection of a specific set of cephalometric landmarks. We distinguish two stages of training. The first uses facial photographs simulated from 3D face models, while the second uses a set of real photographs.

As a neural network, neural networks can be used. In the preferred embodiment of the invention a convolutional neural network is used.

4. Estimation of the Camera-Subject Distance

The estimation of the distance between the subject of a photograph and the camera that took it is carried out by means of a ML model. To train this ML model, we used a database of our own creation including photographs with different subjects, of different populations, ages, and sexes, at different distances, with different focal lengths and in different poses. The training was carried out in two phases. In the first phase, a set of facial photographs simulated from 3D facial models was used, while in the second phase the real photographs were used. Artificial neural networks can be used as a ML model. In the preferred embodiment of the invention a regression convolutional neural network is used.

5. Filtering Based on Morphometric Consistency Between the Skull and the Face The objective of the filtering system is to be able to exclude candidates without the need to carry out an CFS, saving in computational time. In particular, the filtering system takes milliseconds, while an overlay takes seconds.

The developed filtering system is a ML model that learns two relationships separately: 1) the relationship between 3D indices of a skull and 3D indices of the corresponding face; 2) the relationship between 3D facial indices and 2D facial indices. Finally, the method integrates the two relationships, allowing the comparison of 2D facial indices with 3D cranial indices, providing an exclusion method that allows ruling out that the subject of a given skull is the person depicted in a photograph. Regression models such as linear regression by ordinary least squares, support vector machines, random forest or artificial neural networks can be used for the ML model. In the preferred embodiment of the invention an artificial neural network is used.

5.1 Estimation of 3D Facial Indices from 2D Facial Indices

This estimation method is also obtained as a result of the design, development and training of a ML model. For this purpose, 3D facial models of different subjects where the cephalometric landmarks have been located are used. The 3D facial indices are measured on these models. Then, for each facial model, photos in different poses are simulated. On each simulated photograph, the cephalometric landmarks are located, the 2D facial indices are measured, and the camera focal, camera-subject distance, and face pose are recorded. This provides the data set for the estimation task. A regression algorithm is then used to obtain a method for estimating the 3D facial indices from the 2D facial indices and information about the photograph. The estimation is carried out in the form of a prediction interval.

5.2 Estimation of 3D Cranial Indices from 3D Facial Indices

This estimation method is also obtained as a result of the design, development and training of a ML model. For this purpose, the dataset from step 2, which includes 3D facial and cranial models of different subjects, is used and the corresponding 3D facial and cranial indices are measured. This provides the dataset for the estimation task. A regression algorithm is then used to obtain a method for estimating the 3D cranial indices from the 3D facial indices. The estimation is carried out in the form of a prediction interval, rather than point estimation.

5.3 Estimation of 3D Cranial Indices from 2D Facial Indices

The algorithm integrates the two previous ML models. From 2D facial indices, 3D facial indices are estimated, obtaining a series of intervals delimited by their maximum and minimum values. Then, for each index, the two extreme values are considered, and the 3D cranial index estimation method is applied, providing two intervals for each facial index. Finally, the intervals corresponding to each index are joined, so that at the end of the process we have an estimate (in the form of an individual interval) of each of the 3D cranial indices.

5.4 Discarding or Filtering Algorithm

The filtering algorithm aims to discard subjects whose skull is not compatible with the photograph. To that end, the algorithm calculates the cranial indices of the candidate skull and compares the estimated intervals with the 2D facial indices relative to the photograph found. If one or more skull indices fall outside the ranges predicted by the estimate, the subject in the photograph is discarded.

6. Craniofacial Superimposition in Multiple Photographs

The system for the CFS follows the fourth approach mentioned in the introduction, i.e., reducing the problem to the superimposition of craniometric and facial landmarks, and solving the latter as a camera calibration problem. In the following, the description of the algorithm used is divided into three stages that are carried out consecutively.

Figure 2:
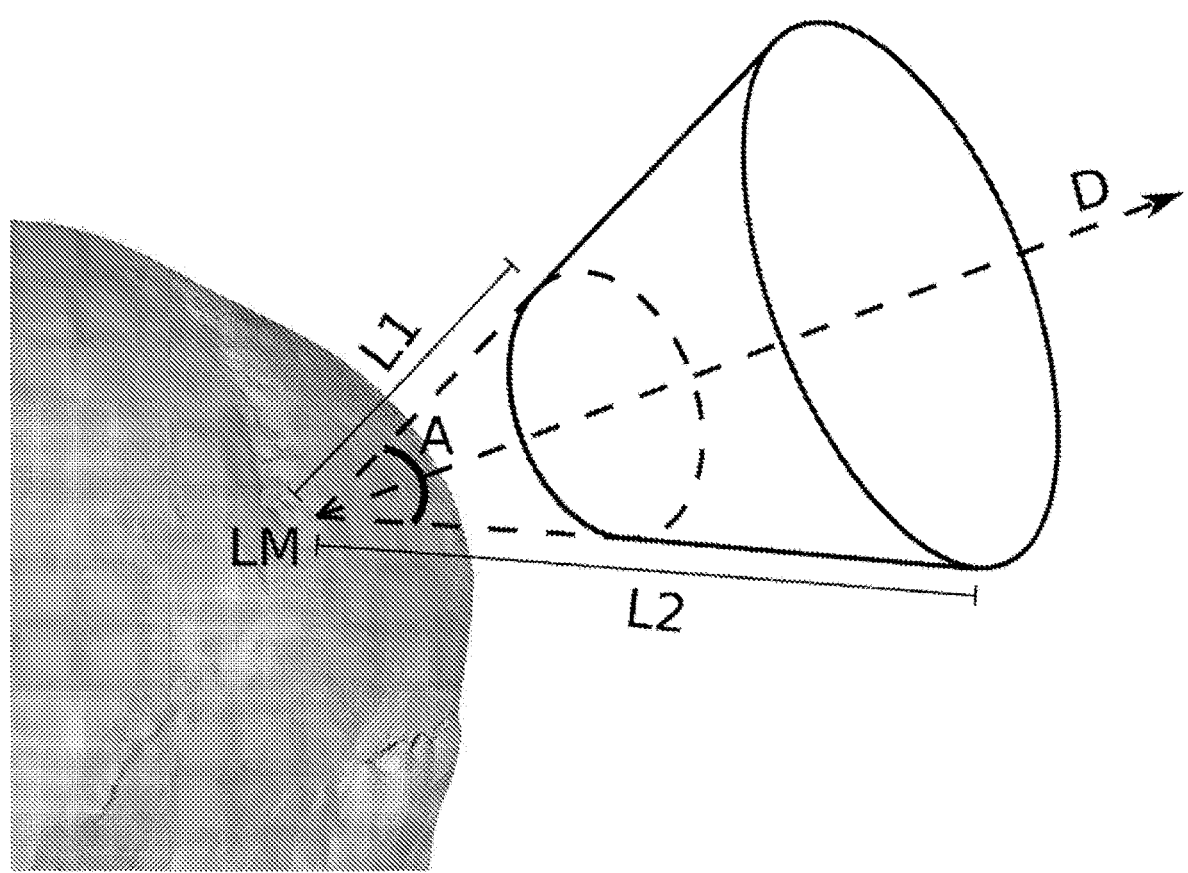
FIG. 2 shows the parameters used in facial soft tissue uncertainty modeling.

6.1 Modeling of Cephalometric Landmarks Location Taking into Account Facial Soft Tissue Uncertainty In this step, the possible positions of the 3D cephalometric landmarks are modeled based on the position of the 3D craniometric landmarks. First, the facial soft tissue thickness and direction estimation algorithm is used to obtain the soft tissue thickness and the corresponding direction between each pair of corresponding anatomical landmarks. The system then defines a region roughly shaped like a truncated cone, whose apex matches with the craniometric landmark and whose D-axis corresponds to the estimated direction (FIG. 2). The angle of the apex of the cone is A, the cone has height L2, and the height of the truncation is L1. Equivalently, the region includes the landmarks X with the characteristic that the vector LM-X has length between L1 and L2 and the angle between LM-X and D is less than A/2. The values of L1, L2 and A are specific to each type of anatomical landmark and are established from the same data used to train the ML model that estimates soft tissue thickness and direction.

6.2 Landmark-Based Camera Calibration

To solve the landmark-based camera calibration problem, the invention uses an iterative optimization algorithm, which includes modeling the uncertainty about the soft tissue and the location of the anatomical landmarks, as well as the use of a priori information about the photograph (focal and subject camera distance estimation). These three novel elements improve both the accuracy and the speed of the system. Said algorithm is able to estimate the position and orientation of the camera together with its focal distance, receiving as input a set of anatomical landmarks located both in the 3D model of the skull and in the photograph of the face.

6.3 CFS on Multiple Photographs of the Same Subject at the Same Time

The system for the CFS carries out an iterative optimization process. In each iteration, the system performs several operations. First, the soft tissue is estimated by randomly choosing a 3D landmark within the estimated region for each craniometric landmark. Second, a camera calibration algorithm is used that takes as input the 2D cephalometric landmarks of each photograph and the 3D cephalometric landmarks resulting from the soft tissue estimation. The algorithm returns, for each photograph, the position, orientation, and focal length of the camera. Third, using the output information from the calibration algorithm, the position of the estimated 3D cephalometric landmarks once projected onto the photograph is calculated for each photograph. Next, for each photograph, the overlay error is calculated, defined as the sum of the Euclidean distances between the 2D cephalometric landmarks in the photograph and the estimated 3D cephalometric landmarks projected on the photograph. Once the overlay error has been calculated for each photograph, the average value is calculated. Fourth, the process is terminated if the average overlay error achieved is below a predetermined threshold, or alternatively, a new iteration is performed. At each iteration, the optimization process favors sampling landmarks that produce an CFS whose overlay error is lower. In this way, iteration after iteration the process manages to achieve overlays with lower error overlay, which leads to the estimated 3D cephalometric landmarks approaching and eventually superimposing with the 2D cephalometric landmarks of each photograph.

7. Decision Making

The decision-making algorithm calculates, for each candidate, a degree of identification support and an identification decision, based on multiple sources of information:
  a. the quality of the available photographs, assessed in step 2,
  b. the morphometric consistency between the skull and the face, using the information provided by step 5,
  c. the average overlay error on the photographs of the subject, provided by step 6,
  d. the plausibility of the distance between pairs of anatomical landmarks in each of the CFSs with respect to the soft tissue study of the reference population.

The calculation of all these quantities and their final integration into a single value for each subject is detailed below.

7.1 Quality of the Photographs

The quality of each photograph QP is assessed by (1) the number NL of cephalometric landmarks detected as visible by step 2 and (2) the area of the photograph AP occupied by cephalometric landmarks, namely the area of the smallest rectangle among those including within it all detected cephalometric landmarks. The following formula is used:

$$QP = (NL + AP/1'000'000)/100$$

7.2 Morphometric Consistency Between Skull and Face

This quantity is calculated for each photograph by estimating the 2D facial indices from the skull and comparing the intervals obtained with the 2D facial indices relative to the photograph. If for an index the estimated interval is [A, B] and the value associated with the photograph is C, the morphometric consistency with the quantity is assessed:

$$0 \text{ if } C < A \text{ or } C > B$$
$$2(C - A)/(B - A) \text{ if } C < (A + B)/2$$
$$2(B - C)/(B - A)$$

Next, the values associated with each index are multiplied together, giving rise to the value associated with a photograph. Finally, the value associated with a subject is the product of the values of its photographs.

7.3 Overlay Error

The overlay error associated with a subject is the average overlay error over the photographs of that subject after automatic CFS.

7.4 Soft Tissue Likelihood

This quantity measures the plausibility of the facial soft tissue thickness associated with each pair of anatomical landmarks. It uses information derived from an own population study, where the statistical distribution of soft tissue thickness is modeled. The starting point is the set of vectors estimated during craniofacial superimposition. For each vector its length is calculated and compared with the thickness distribution, calculating the probability of that length within the distribution. Finally, the likelihood value is the product of these probabilities.

7.5 Degree of Identification Support

The degree of identification support (DS) is calculated by adding the information of the quality of the photograph (QP), morphometric consistency (MC), overlay error (OE) and soft tissue likelihood (TL), according to the following formula:

$$DS=QP*MC*TL/OE$$

The degree of identification support is used in multiple comparison scenarios, with the individual with the highest degree of support being the candidate proposed by the system. The system also returns a ranking of the candidates, i.e., an ordered list of candidates whose order follows the degree of support.

The advantages of the present invention over the state of the art are primarily:
  it makes possible to carry out an identification without depending on the availability of a forensic expert with specific experience in the application of the overlay technique;
  it provides accurate, objective, reproducible and easily explained information, avoiding the subjective assessment of an expert;
  allows time savings from hours to seconds;
  it makes possible to apply the overlay technique to scenarios with a large number of victims, where an even larger number of CFOs are needed, which is completely unfeasible with non-automated techniques due to their long execution time.

7.6 Identification Decision

In its final step, the invention makes the identification decision using the degree of identification support. Specifically, a positive identification is established when a likelihood ratio value of 10 is exceeded considering a reference cohort.

In view of this description and figures, the expert may understand that the invention has been described according to the preferred embodiment thereof, but that multiple variations may be introduced in said preferred embodiment without exceeding the object of the invention as claimed.

The invention claimed is:

1. A method for identification of multiple skulls with different subjects, when (i) a three-dimensional model of each skull and (ii) one or more indubitable facial photographs of each of the candidate subjects are available, the method comprising the following steps:
   detecting craniometric landmarks on the three-dimensional model of each skull by:
      applying a template where the craniometric landmarks have been located;
      adapting the dimensions of said template to the three-dimensional model of the skull;
      aligning the template with said model in such a way that both are overlaid,
      transferring the craniometric landmarks to the three-dimensional model of the skull;
      refining the position of the craniometric landmarks according to specific criteria for each landmark using information on symmetry axes, nostrils and eye socket contours, end landmarks of the anatomical axes, position of sutures;
   automatically estimating facial soft tissue thickness and direction, by:
      simultaneously estimating thickness in mm and directional vector;
      using a machine learning model previously trained with real data of soft tissue, lineage, age, sex of the subject and BMI;
   detecting cephalometric landmarks in facial photographs by:
      using a machine learning model pre-trained with thousands of photographs and their respective cephalometric landmarks
   automatic craniofacial superimposition with one or multiple photographs at the same time, by:
      using a priori information: focal, pose and camera-subject distance estimation;
      modeling of the cephalometric landmark marking error and of the uncertainty of the soft tissue thickness and direction;
      estimating soft tissue shared between photographs in cases where several photographs of the same subject are available;
   automatic decision-making step, aggregating information from:
      the quality of the available photographs
      the morphometric consistency between the skull and the face
      the average overlay error on the photographs of each of the candidate subjects
      the plausibility of the soft tissue with respect to the human population.

2. The method according to claim 1 comprising, before the automatic craniofacial superimposition step, an automatic step of estimating the camera-subject distance of the one of more facial photographs, comprising:
   using photographs in which the face shows any pose, obtained with any focal length;
   using a machine learning model previously trained with thousands of photographs whose camera-subject distance is known.

3. The method according to claim 1 comprising, before the automatic craniofacial superimposition step, an automatic step of discarding candidates whose skull is not compatible with the photograph, the steps of:
   estimating 3D cranial indices from 2D facial indices; and
   using a machine learning model previously trained with thousands of photographs and 3D skull models.

4. The method according to claim 2 comprising, before the automatic craniofacial superimposition step, an automatic step of discarding candidates whose skull is not compatible with the photograph, the steps of:
   estimating 3D cranial indices from 2D facial indices; and
   using a machine learning model previously trained with thousands of photographs and 3D skull models.

* * * * *